(12) United States Patent
Hida et al.

(10) Patent No.: US 10,958,096 B2
(45) Date of Patent: Mar. 23, 2021

(54) POWER SUPPLY SYSTEM

(71) Applicant: TOYOTA JIDOSHA KABUSHIKI KAISHA, Toyota (JP)

(72) Inventors: Minoru Hida, Nisshin (JP); Akihiro Ozeki, Chiryu (JP); Kohei Nishi, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 121 days.

(21) Appl. No.: 16/255,066

(22) Filed: Jan. 23, 2019

(65) Prior Publication Data
US 2019/0260225 A1 Aug. 22, 2019

(30) Foreign Application Priority Data
Feb. 16, 2018 (JP) .............................. JP2018-026154

(51) Int. Cl.
*H02J 9/06* (2006.01)
*H02J 7/14* (2006.01)
*H02M 3/158* (2006.01)
*B60L 50/60* (2019.01)
*B60L 58/18* (2019.01)
(Continued)

(52) U.S. Cl.
CPC .............. *H02J 9/061* (2013.01); *B60L 50/60* (2019.02); *B60L 58/18* (2019.02); *H02J 1/10* (2013.01); *H02J 7/1423* (2013.01); *H02J 7/1461* (2013.01); *H02J 7/342* (2020.01); *H02M 3/158* (2013.01); *H02J 2007/0067* (2013.01)

(58) Field of Classification Search
CPC .... H02J 9/061; H02J 7/342; H02J 1/10; H02J 7/1423; H02J 7/1461; H02J 2007/0067; H02J 7/16; B60L 58/18; B60L 50/60; H02M 3/158
See application file for complete search history.

(56) References Cited

U.S. PATENT DOCUMENTS

2006/0097577 A1* 5/2006 Kato ..................... H02J 7/1423
307/10.1
2008/0150483 A1 6/2008 Morita et al.
(Continued)

FOREIGN PATENT DOCUMENTS

JP 2004-328988 A 11/2004
JP 2018-125956 A 8/2018
WO 2017/138448 A1 8/2017

OTHER PUBLICATIONS

Kalawoun, Jana. "From a Novel Classification of the Battery State of Charge Estimators Toward a Conception of an Ideal One". Journal of Power Sources, vol. 279, 2015, 694-706 pp.

*Primary Examiner* — Rexford N Barnie
*Assistant Examiner* — Thai H Tran
(74) *Attorney, Agent, or Firm* — Oliff PLC

(57) ABSTRACT

A power supply system including: a first battery connected to a first load; a second battery; a DC-DC converter connecting the first battery and the second battery; and a connection switching unit including a first switch configured to connect the first battery to a second load and a second switch configured to connect the second battery to the second load. The connection switching unit is configured to switch selectively to a first mode in which the first switch is closed and the second switch is opened and a second mode in which the first switch is opened and the second switch is closed.

5 Claims, 3 Drawing Sheets

(51) Int. Cl.
*H02J 1/10* (2006.01)
*H02J 7/34* (2006.01)
*H02J 7/00* (2006.01)

(56) References Cited

U.S. PATENT DOCUMENTS

2017/0036622 A1 2/2017 Horn et al.
2018/0219407 A1 8/2018 Nakamura
2018/0334118 A1* 11/2018 Masui .................... B60L 3/0069
2018/0370465 A1 12/2018 Sato

* cited by examiner

POWER SUPPLY SYSTEM

INCORPORATION BY REFERENCE

The disclosure of Japanese Patent Application No. 2018-026154 filed on Feb. 16, 2018 including the specification, drawings and abstract is incorporated herein by reference in its entirety.

BACKGROUND

1. Technical Field

The disclosure relates to a power supply system.

2. Description of Related Art

Japanese Unexamined Patent Application Publication No. 2004-328988 (JP 2004-328988 A) discloses a power supply system for a vehicle in which a power supply is redundantly constituted using a main battery and a sub-battery. In such a power supply system, redundancy of a power supply is secured by connecting the main battery directly to a load mounted in the vehicle and connecting the sub-battery to a load mounted in the vehicle via a DC-DC converter or a relay switch.

SUMMARY

When a sub-battery is used as a backup power supply for an important load in automatic driving, a state of a sub-battery may be diagnosed to maintain the state of the sub-battery in a predetermined state which is required for a backup power supply. However, in the power supply system described in JP 2004-328988 A, since the sub-battery is normally connected to a load via one of a DC-DC converter and a relay switch, there may be a case in which it is not easy to diagnose a state of the sub-battery alone and to maintain a predetermined state.

The disclosure provides a power supply system that can easily diagnose a state of a predetermined battery alone and maintain a predetermined state.

An aspect of the disclosure provides a power supply system including: a first battery connected to a first load; a second battery; a DC-DC converter connecting the first battery and the second battery; and a connection switching unit including a first switch configured to connect the first battery to a second load and a second switch configured to connect the second battery to the second load. The connection switching unit is configured to switch selectively to a first mode in which the first switch is closed and the second switch is opened and a second mode in which the first switch is opened and the second switch is closed.

In the power supply system according to the aspect, when the first switch is closed to supply electric power directly from the first battery to the second load, the second switch is opened to disconnect the second battery from the second load (the first mode). Accordingly, by charging and discharging control using the DC-DC converter, it is possible to easily diagnose a state of the second battery alone and to easily maintain a predetermined state. In the first mode, since it is not necessary to supply electric power to the second load and only state diagnosis and state maintenance of the second battery have to be performed, the DC-DC converter can curb power consumption. On the other hand, when the first switch is opened to disconnect the first battery from the second load, the second switch is closed to connect the second battery to the second load (the second mode). Accordingly, even when the first battery malfunctions, it is possible to supply electric power from the second battery to the second load.

In the above aspect, the connection switching unit may be configured to switch states of the first switch and the second switch after controlling a voltage difference between a primary side and a secondary side of the DC-DC converter such that the voltage difference becomes equal to or less than a predetermined value.

Since the voltage difference between the primary side and the secondary side of the DC-DC converter can be decreased by this control, it is possible to curb fluctuation of a voltage when a mode is switched. It is possible to quickly switch a mode.

In the above aspect, the power supply system may be mounted in a vehicle, and the connection switching unit may be configured to switch to the first mode when the vehicle is in a manual driving mode and to switch to the second mode when the vehicle is in an automatic driving mode.

In the above aspect, the connection switching unit may be configured to perform a diagnosis of a state of charge of the second battery by causing the second battery to discharge electric power to a first battery side via the DC-DC converter.

In the above configuration, the connection switching unit may be configured to perform the diagnosis at predetermined time intervals in the first mode.

In the above configuration, the connection switching unit may be configured to charge the second battery via the DC-DC converter when it is determined as a result of the diagnosis that the state of charge of the second battery is less than a predetermined state of charge.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

[Outline]

In a power supply system redundantly including a plurality of batteries according to the disclosure, a sub-battery is disconnected from a load in a normal state in which electric power is supplied from a main battery to the load. Accordingly, it is possible to easily diagnose a state of a sub-battery alone and to easily maintain a predetermined state.

[Configuration of Power Supply System]

Figure 1:
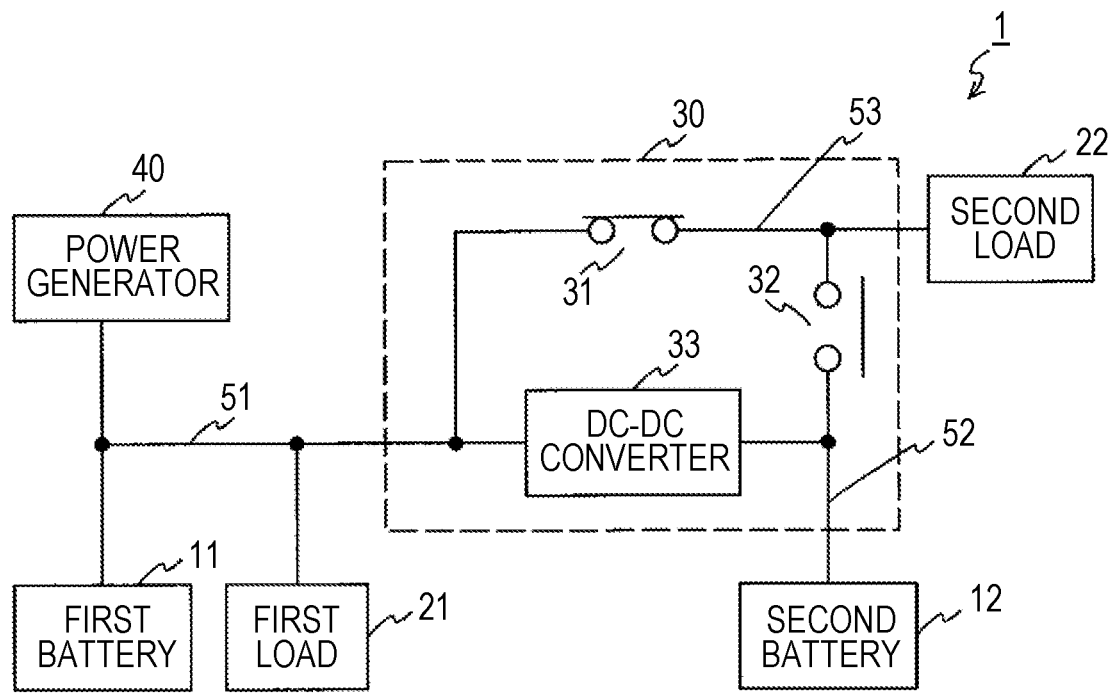
FIG. 1 is a diagram schematically illustrating a configuration of a power supply system according to an embodiment of the disclosure.

FIG. 1 is a diagram schematically illustrating a configuration of a power supply system 1 according to an embodiment of the disclosure. The power supply system 1 illustrated in FIG. 1 includes a first battery 11, a second battery 12, a first load 21, a second load 22, a connection switching unit 30, and a power generator 40.

The first battery 11, the first load 21, the connection switching unit 30, and the power generator 40 are connected to a first electric wire 51. The second battery 12 and the connection switching unit 30 are connected to a second electric wire 52. The second load 22 and the connection switching unit 30 are connected to a third electric wire 53.

The power supply system 1 according to this embodiment can be mounted in a facility requiring a redundant power supply configuration. In the following embodiment, it is assumed that the power supply system 1 is mounted in a vehicle which is switchable between a manual driving mode and an automatic driving mode.

The power generator 40 is a device that can output predetermined electric power such as an alternator or a DC-DC converter. Electric power output from the power generator 40 is supplied to the first battery 11, the first load 21, or the like.

The first battery 11 is a power storage element which is configured to be chargeable and dischargeable such as a lead storage battery or a lithium-ion battery. The first battery 11 stores electric power output from the power generator 40 or discharges electric power stored therein to the first load 21 and the connection switching unit 30. The first battery 11 is provided as a main battery which is used for traveling of the vehicle. A capacitor may be used instead of the battery.

The second battery 12 is a power storage element which is configured to be chargeable and dischargeable such as a lead storage battery or a lithium-ion battery. The second battery 12 stores electric power output from the power generator 40 or electric power supplied from the first battery 11 via the connection switching unit 30 or discharges (supplies) electric power stored therein to the second load 22 or the like via the connection switching unit 30. The second battery 12 is redundantly provided as a sub-battery for backing up the first battery 11.

The first load 21 is an onboard device that consumes electric power. The first load 21 is configured to operate with electric power output from the power generator 40 and/or electric power stored in the first battery 11.

The second load 22 is an onboard device that consumes electric power and can be set as a device associated with safe traveling of a vehicle. More specifically, the second load 22 is an important load that requires supply of electric power based on a predetermined current for a predetermined period from the second battery 12 even when supply of electric power using the first battery 11 malfunctions, and can be set as, for example, a load that takes charge of an important function of allowing the vehicle to safely run in a limp-home mode in an emergency in automatic driving. As will be described later, the second load 22 is configured to operate with electric power output from the power generator 40 and/or electric power stored in the first battery 11 at the time of manual driving and to operate with electric power stored in the first battery 11 and/or electric power stored in the second battery 12 at the time of automatic driving.

The connection switching unit 30 includes a first switch 31, a second switch 32, and a DC-DC converter 33. These elements are controlled by a control unit such as a microcomputer which is not illustrated.

The first switch 31 is disposed between the first electric wire 51 and the third electric wire 53, and is configured to be opened and closed based on a driving mode of a vehicle. The first switch 31 is closed to connect the first electric wire 51 and the third electric wire 53 when the vehicle is in a manual driving mode, and is opened to disconnect the third electric wire 53 from the first electric wire 51 when the vehicle is in an automatic driving mode. For example, a normally-ON type semiconductor relay or an excitation type mechanical relay can be used as the first switch 31.

The second switch 32 is disposed between the second electric wire 52 and the third electric wire 53 and is configured to be opened and closed based on the driving mode of the vehicle. The second switch 32 is closed to connect the second electric wire 52 and the third electric wire 53 when the vehicle is in the automatic driving mode, and is opened to disconnect the third electric wire 53 from the second electric wire 52 when the vehicle is in the manual driving mode. For example, a normally-OFF type semiconductor relay or an excitation type mechanical relay can be used as the second switch 32.

The DC-DC converter 33 is a voltage converter that converts an input voltage into a predetermined voltage and outputs the predetermined voltage. A primary side of the DC-DC converter 33 is connected to the first electric wire 51 and a secondary side thereof is connected to the second electric wire 52. The DC-DC converter 33 can be, for example, a bidirectional step-up/down type DC-DC converter having a step-down function of stepping down a primary-side voltage and outputting the stepped-down voltage to the secondary side and a step-up function of stepping up a secondary-side voltage and outputting the stepped-up voltage to the primary side.

Figure 2:
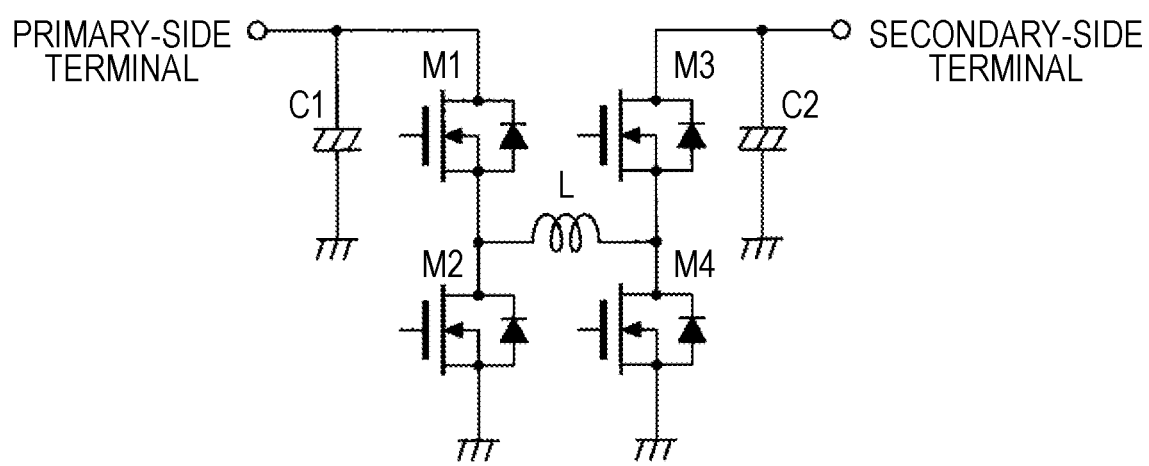
FIG. 2 is a diagram illustrating an example of a configuration of a DC-DC converter.

An example of the bidirectional step-up/down type DC-DC converter is illustrated in FIG. 2. In the DC-DC converter illustrated in FIG. 2, a switching element M1, an inductor L, and a switching element M3 which are connected in series are interposed between a primary-side terminal and a secondary-side terminal. A node between the switching element M1 and the inductor L is grounded via a switching element M2, and a node between the inductor L and the switching element M3 is grounded via a switching element M4. Smoothing capacitors C1 and C2 which are grounded are connected to the primary-side terminal and the secondary-side terminal. For example, a metal oxide semiconductor field effect transistor (MOSFET) can be used as the switching elements M1 to M4. Gate voltages of the switching elements M1 to M4 are controlled by a control unit which is not illustrated and the switching elements are turned on and off.

[Control Performed by Power Supply System]

Figure 3:
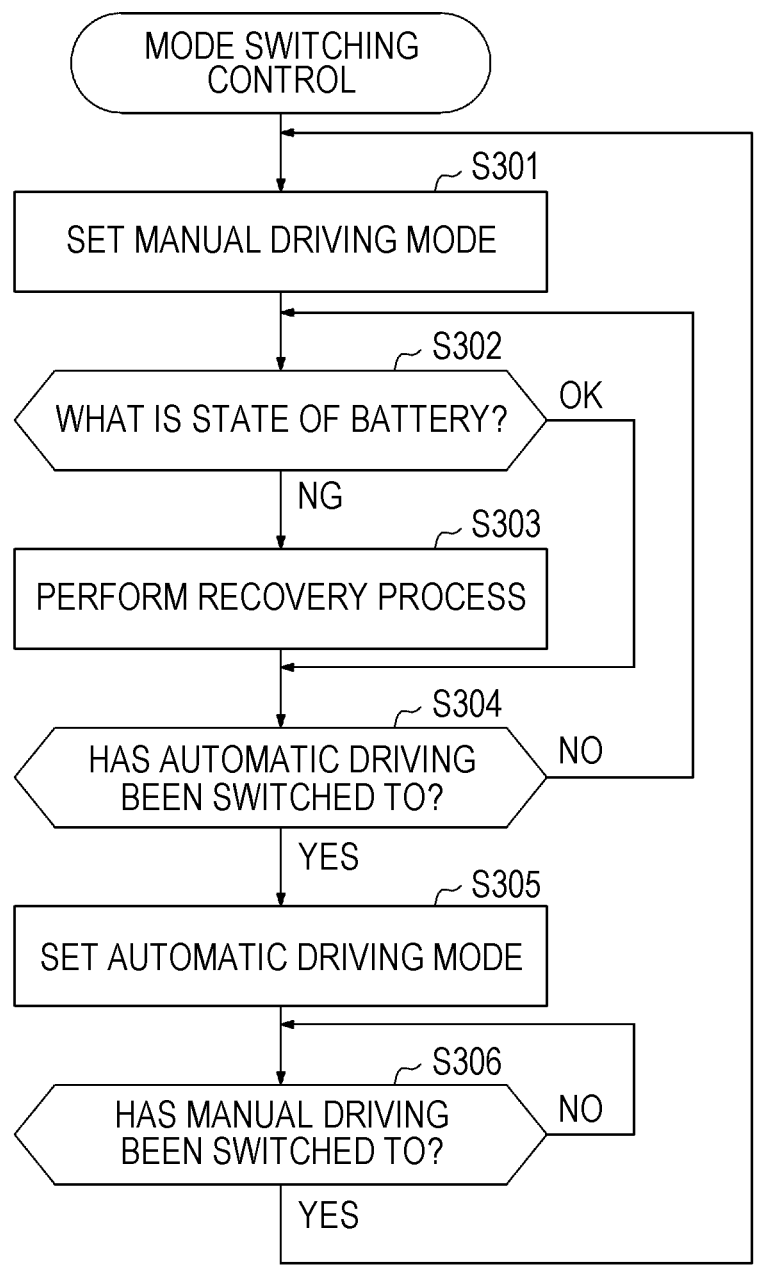
FIG. 3 is a flowchart illustrating mode switching control which is performed by a connection switching unit.
Figure 4:
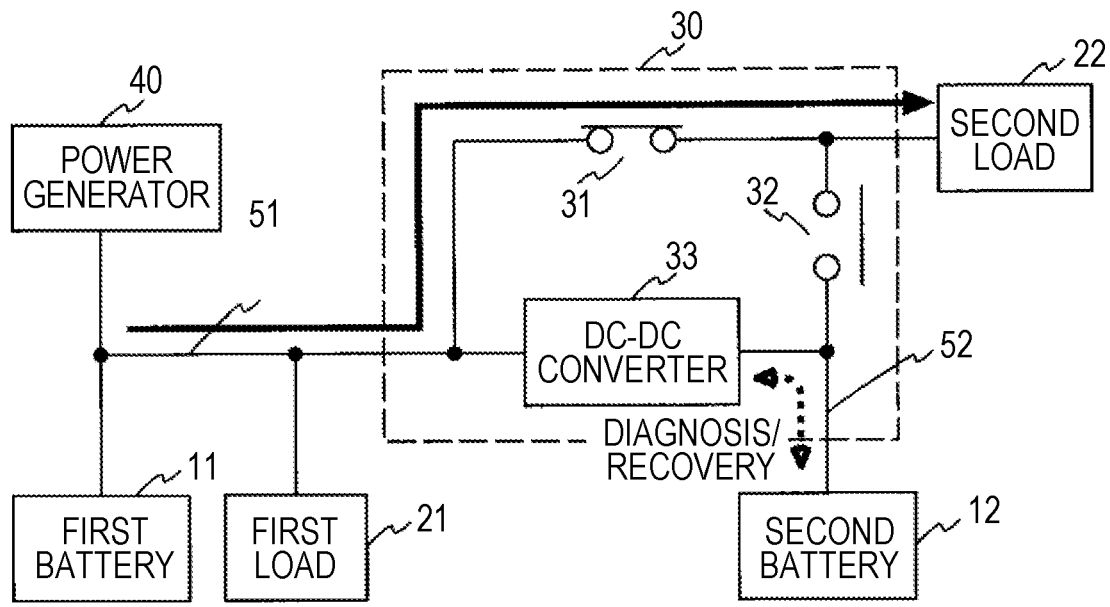
FIG. 4 is a diagram illustrating states of first and second switches in a manual driving mode.
Figure 5:
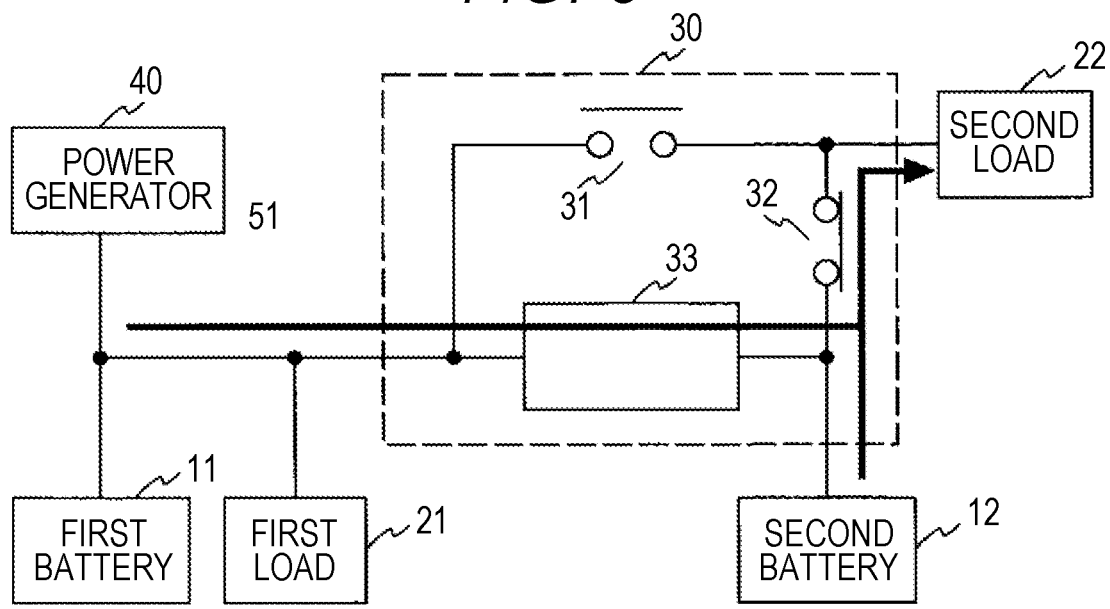
FIG. 5 is a diagram illustrating states of first and second switches in an automatic driving mode.

Control which is performed by the power supply system 1 according to this embodiment will be described below with reference to FIGS. 3 to 5. FIG. 3 is a flowchart illustrating a process routine of mode switching control which is performed by the connection switching unit 30. FIG. 4 is a diagram illustrating the states of the first switch 31 and the second switch 32 in the manual driving mode. FIG. 5 is a diagram illustrating the states of the first switch 31 and the second switch 32 in the automatic driving mode.

The control illustrated in FIG. 3 is started when a power supply of the vehicle is turned on and is repeatedly performed until the power supply is turned off. It is assumed that the manual driving mode is set in an initial state of the vehicle immediately after the power supply is turned on.

Step S301: The connection switching unit 30 closes the first switch 31 and opens the second switch 32 to set the power supply system 1 to the "manual driving mode (FIG. 4)." When the manual driving mode is set, the process routine transitions to Step S302.

In the manual driving mode, since electric power can be supplied from the first battery 11 to the second load 22 without passing through the DC-DC converter 33 (a solid arrow in FIG. 4), power consumption in the DC-DC converter 33 can be curbed. Since the second battery 12 is disconnected from the second load 22 and a current does not flow from the second battery 12 to the second load 22, discharging of the second battery 12 can be curbed. Since the second battery 12 is connected to the first battery 11 and the power generator 40 via the DC-DC converter 33, the second battery 12 can be charged with electric power from the first battery 11 or electric power from the power generator 40. Since the DC-DC converter 33 is of a bidirectional type, electric power can be discharged from the second battery 12 (the second electric wire 52 side) to the first battery 11 or the like (the first electric wire 51 side).

Step S302: The connection switching unit 30 diagnoses the state of the second battery 12. This diagnosis is performed, for example, by determining whether the second battery 12 is in a predetermined state at predetermined time intervals. That is, the connection switching unit 30 may be configured to automatically determine whether the second battery 12 is in a predetermined state at predetermined time intervals. The predetermined state refers to, for example, a state in which the second battery 12 is storing electric power with which the second battery 12 can output a prescribed current value continuously for a prescribed time. Whether the second battery is in the predetermined state is determined based on a state of charge (SOC) or an internal resistance value of the second battery 12. This diagnosis can be performed, for example, based on change in a voltage value and a current value when electric power is discharged from the second battery 12 to the first electric wire 51 via the DC-DC converter 33 (a dotted arrow in FIG. 4). The process routine transitions to Step S304 when the second battery 12 is in the predetermined state (OK in S302), and the process routine transitions to Step S303 when the second battery 12 is not in the predetermined state (NG in S302).

Step S303: The connection switching unit 30 performs a predetermined recovery process such that the second battery 12 is brought into the predetermined state. Examples of the recovery process include a process of charging the second battery 12 with electric power from the first battery 11 or the like via the DC-DC converter 33 when the state of charge of the second battery 12 is less than a predetermined state of charge and a process of discharging electric power from the second battery 12 to the first electric wire 51 via the DC-DC converter 33 when the state of charge of the second battery 12 is greater than the predetermined state of charge (a dotted arrow in FIG. 4). When the recovery process is performed, the process routine transitions to Step S304.

Step S304: The connection switching unit 30 determines whether the vehicle has been switched from manual driving to automatic driving. The process routine returns to Step S302 when the vehicle has not been switched to automatic driving and is maintained in manual driving (NO in S304), and the process routine transitions to Step S305 when the vehicle has been switched from manual driving to automatic driving (YES in S304).

The determination of Step S304 may be performed in parallel to the processes of Steps S302 and S303, and Step S305 is preferably performed after recovery of the second battery 12 in Step S303 has been completed.

Step S305: The connection switching unit 30 opens the first switch 31 and closes the second switch 32 to set the power supply system 1 to the "automatic driving mode (FIG. 5)." When the automatic driving mode is set, the process routine transitions to Step S306.

In the automatic driving mode, electric power is supplied from the first battery 11 to the second load 22 via the DC-DC converter 33 and electric power is also supplied from the second battery 12 (a solid arrow in FIG. 5). Accordingly, for example, in an emergency in which the first battery 11 malfunctions, the second battery 12 is not easily affected by the malfunction due to the operation of the DC-DC converter 33 and thus supply of electric power from the second battery 12 to the second load 22 can be backed up.

Reasons why the second battery 12 is not easily affected even when the first battery 11 malfunctions will be described below with reference to FIG. 2. When the primary-side voltage of the DC-DC converter 33 connected to the first battery 11 becomes lower than the secondary-side voltage connected to the second battery 12, a step-up operation of allowing a current to flow from the primary side to the secondary side (charging of the inductor L with energy due to turning-on of the switching elements M1 and M4 and discharging of energy from the inductor L due to turning-off of the switching element M4 and turning-on of the switching element M3) is performed by a control unit which his not illustrated. Accordingly, a current is not discharged from the second battery 12 via the DC-DC converter 33. When a voltage drop of the primary side of the DC-DC converter 33 progresses further, a control unit which is not illustrated stops operation of the DC-DC converter 33 (turns off all the switching elements M1 to M4) and thus a current is not discharged from the second battery 12 via the DC-DC converter 33. In this way, electric power of the second battery 12 is maintained.

Step S306: The connection switching unit 30 determines whether the vehicle has been switched from automatic driving to manual driving. The determination of Step S306 is continuously performed when the vehicle has not been switched to manual driving and is maintained in automatic driving (NO in S306), and the process routine returns to Step S301 when the vehicle has been switched from automatic driving to manual driving (YES in S306).

When a driving mode is switched, it is preferable that one battery be charged or discharged such that a voltage difference between the primary side and the secondary side of the DC-DC converter 33 is less than a predetermined value as much as possible in order to curb an influence of a voltage change. Here, when a current is discharged from the secondary side to the primary side of the DC-DC converter 33, there is concern that a source voltage of the first electric wire 51 will become higher than an output voltage of the power generator 40 and will exceed the rated voltage of the first load 21. In order to prevent this likelihood, it is useful to decrease the output voltage of the power generator 40 in advance when a current is discharged from the secondary side to the primary side of the DC-DC converter 33.

[Operations and Advantages in Embodiment]

With the power supply system 1 according to the embodiment of the disclosure, the connection switching unit 30 closes the first switch 31 to supply electric power from the first battery 11 to the second load 22 and opens the second switch 32 to disconnect the second battery 12 from the second load 22 in the manual driving mode (the first mode).

Accordingly, in the manual driving mode, it is possible to easily diagnose the state of the second battery 12 for backup in automatic driving by charging and discharging control using the DC-DC converter 33 alone and to easily maintain the state in which electric power can be supplied with a predetermined current for a predetermined period. In the manual driving mode, the DC-DC converter 33 does not need to supply electric power to the second load 22 and has only to perform state diagnosis and state maintenance of the second battery 12 and thus can reduce power consumption.

With the power supply system 1 according to the embodiment, when the connection switching unit 30 opens the first switch 31 to disconnect the first battery 11 from the second load 22 in the automatic driving mode (the second mode), the connection switching unit 30 closes the second switch 32 to connect the second battery 12 to the second load 22.

Accordingly, in the automatic driving mode, it is possible to supply electric power from the second battery 12 to the second load 22 even when the first battery 11 malfunctions.

With the power supply system 1 according to the embodiment, the connection switching unit 30 switches the states of the first switch 31 and the second switch 32 after performing control such that the voltage difference between the primary side and the secondary side of the DC-DC converter 33 is equal to or less than a predetermined value. Accordingly, since the voltage difference between the primary side and the secondary side of the DC-DC converter 33 can be decreased, it is possible to curb occurrence of a voltage change when the driving mode is switched. It is possible to quickly switch the driving mode.

When the power supply of the vehicle is turned off, it is preferable that the manual driving mode in which the first switch 31 illustrated in FIG. 4 is closed and the second switch 32 is open be set such that a standby current flowing in the second load 22 is supplied from the first battery 11.

In the embodiment, the bidirectional step-up/down type DC-DC converter 33 is used, but a DC-DC converter not the "bidirectional" type may be used.

The power supply system according to the disclosure is applicable to a vehicle which redundantly includes a plurality of batteries.

What is claimed is:

1. A power supply system mounted in a vehicle, the power supply system comprising:
    a first battery connected to a first load;
    a second battery;
    a DC-DC converter connecting the first battery and the second battery; and
    a connection switching unit including a first switch configured to connect the first battery to a second load and a second switch configured to connect the second battery to the second load,
    wherein the connection switching unit is configured to:
        switch selectively to a first mode in which the first switch is closed and the second switch is opened and a second mode in which the first switch is opened and the second switch is closed; and
        switch to the first mode when the vehicle is in a manual driving mode and to switch to the second mode when the vehicle is in an automatic driving mode.

2. The power supply system according to claim 1, wherein the connection switching unit is configured to switch states of the first switch and the second switch after controlling a voltage difference between a primary side and a secondary side of the DC-DC converter such that the voltage difference becomes equal to or less than a predetermined value.

3. The power supply system according to claim 1, wherein the connection switching unit is configured to perform a diagnosis of a state of charge of the second battery by causing the second battery to discharge electric power to a first battery side via the DC-DC converter.

4. The power supply system according to claim 3, wherein the connection switching unit is configured to perform the diagnosis at predetermined time intervals in the first mode.

5. The power supply system according to claim 3, wherein the connection switching unit is configured to charge the second battery via the DC-DC converter when it is determined as a result of the diagnosis that the state of charge of the second battery is less than a predetermined state of charge.

\* \* \* \* \*